(12) United States Patent
Mikami

(10) Patent No.: US 8,792,799 B2
(45) Date of Patent: Jul. 29, 2014

(54) IMAGE FORMING APPARATUS AND CONTROL METHOD THEREOF

(75) Inventor: Fumio Mikami, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/437,712

(22) Filed: Apr. 2, 2012

(65) Prior Publication Data

US 2012/0250088 A1 Oct. 4, 2012

Related U.S. Application Data

(63) Continuation of application No. 12/641,252, filed on Dec. 17, 2009, now Pat. No. 8,170,438.

(30) Foreign Application Priority Data

Dec. 27, 2008 (JP) .................................. 2008-335449

(51) Int. Cl.
 *G03G 15/00* (2006.01)
(52) U.S. Cl.
 USPC .......................................................... 399/88
(58) Field of Classification Search
 USPC .......................................... 399/38, 43, 75, 88
 See application file for complete search history.

(56) References Cited

U.S. PATENT DOCUMENTS

| 4,678,316 | A | * | 7/1987 | Abuyama | 399/70 |
| 5,376,990 | A | * | 12/1994 | Savage | 399/26 |
| 5,809,369 | A | * | 9/1998 | Furuya et al. | 399/88 X |
| 5,862,437 | A | * | 1/1999 | Kutsuwada et al. | 399/88 |
| 7,317,879 | B2 | * | 1/2008 | Matsuzaki | 399/43 X |
| 7,334,146 | B2 | * | 2/2008 | Kobayashi et al. | 713/324 |
| 2004/0227970 | A1 | * | 11/2004 | Ohara | 358/1.13 |

FOREIGN PATENT DOCUMENTS

| JP | 07-199773 | * | 8/1995 |
| JP | 07-199773 | A | 8/1995 |
| JP | 2006-323249 | A | 11/2006 |

* cited by examiner

*Primary Examiner* — Sandra Brase

(74) *Attorney, Agent, or Firm* — Canon USA Inc. IP Division

(57) ABSTRACT

The present invention is directed to an image forming apparatus which can reduce power supply to a first control unit when the image forming apparatus operates in a power saving mode and cause an image forming unit to perform a specific operation without using the first control unit, and a control method thereof.

23 Claims, 14 Drawing Sheets

IMAGE FORMING APPARATUS AND CONTROL METHOD THEREOF

CROSS-REFERENCE TO RELATED APPLICATIONS

This application is a continuation of application Ser. No. 12/641,252 filed Dec. 17, 2009 that claims the benefit of Japanese Patent Application No. 2008-335449, filed Dec. 27, 2008, both of which are hereby incorporated by reference in their entirety.

BACKGROUND OF THE INVENTION

1. Field of the Invention

The present invention relates to an image forming apparatus and control method thereof.

2. Description of the Related Art

In an image forming apparatus such as a multifunction peripheral, it may become necessary to perform a post-processing operation in a printer unit at predetermined time intervals after the image forming apparatus has shifted to a power saving mode and a controller unit has been shut down. Conventionally, in such a case, the controller unit is switched on by activating a hard disk only to perform the post-processing operation.

The controller unit is thus switched on and activated while the post-processing of the printer unit is being performed in the power saving mode although the controller unit can be shut down.

Examples of the post-processing operation of the printer unit are as described below.

Rotating a photosensitive drum at regular time intervals to prevent an imprint generated by a blade pressing on the photosensitive drum for a long time, and suppress an influence on an image to be formed.

Rotating an exhaust fan for a predetermined period of time to discharge gas remaining inside the image forming apparatus (refer to Japanese Patent Application Laid-Open No. 7-199773).

A central processing unit (CPU) in the controller unit performs various controls so that the image forming apparatus operates as the multifunction peripheral. More specifically, the CPU controls an operation panel, a scanner, an image processing unit, communication for receiving commands such as a print command from a network, and communication for instructing the printer unit to perform printing. When an operation mode of the image forming apparatus shifts to the power saving mode, the above-described control is stopped, and the CPU is switched off.

Further, conventionally, the CPU in the controller unit performs printer control for performing the post-processing operation in the printer unit. It is thus necessary to activate the controller unit when the post-processing of the printer unit is to be performed.

SUMMARY OF THE INVENTION

The present invention is directed to an image forming apparatus which can reduce power supply to a first control unit when the image forming apparatus operates in a power saving mode and cause an image forming unit to perform a specific operation without using the first control unit, and a control method thereof.

According to an aspect of the present invention, an image forming apparatus includes an image forming unit configured to form an image on recording paper, a first control unit configured to control the image forming unit, a second control unit configured to control the image forming unit, and a power supplying unit configured to supply power, when the image forming apparatus is to operate in a normal power mode, such that the first control unit goes into a normal power state in which the first control unit can control the image forming unit, and supply power, when the image forming apparatus is to operate in a power saving mode, such that the first control unit goes into a power saving state in which the first control unit cannot control the image forming unit and the second control unit goes into a state in which the second control unit can control the image forming unit, wherein the second control unit controls the power supplying unit to supply power to the image forming unit and controls the image forming unit to perform a specific operation at predetermined timing when the image forming apparatus operates in the power saving mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
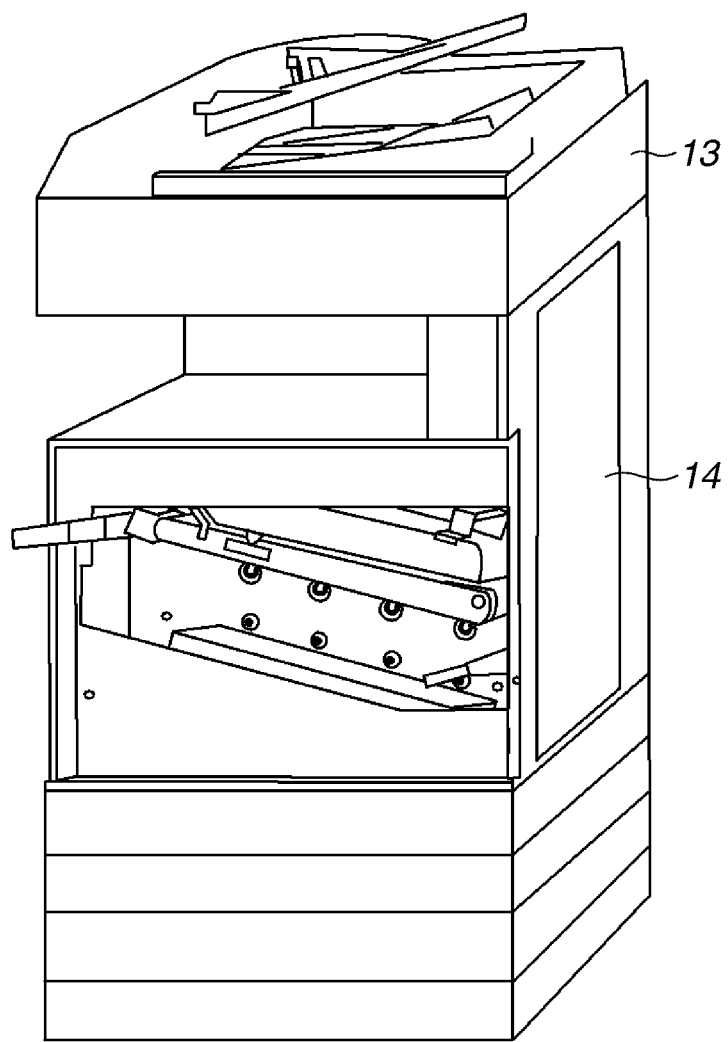
FIG. 1 illustrates an external view of an image forming apparatus according to an exemplary embodiment of the present invention.

FIG. 1 illustrates an external view of an image forming apparatus according to a first exemplary embodiment of the present invention.

Figure 2:
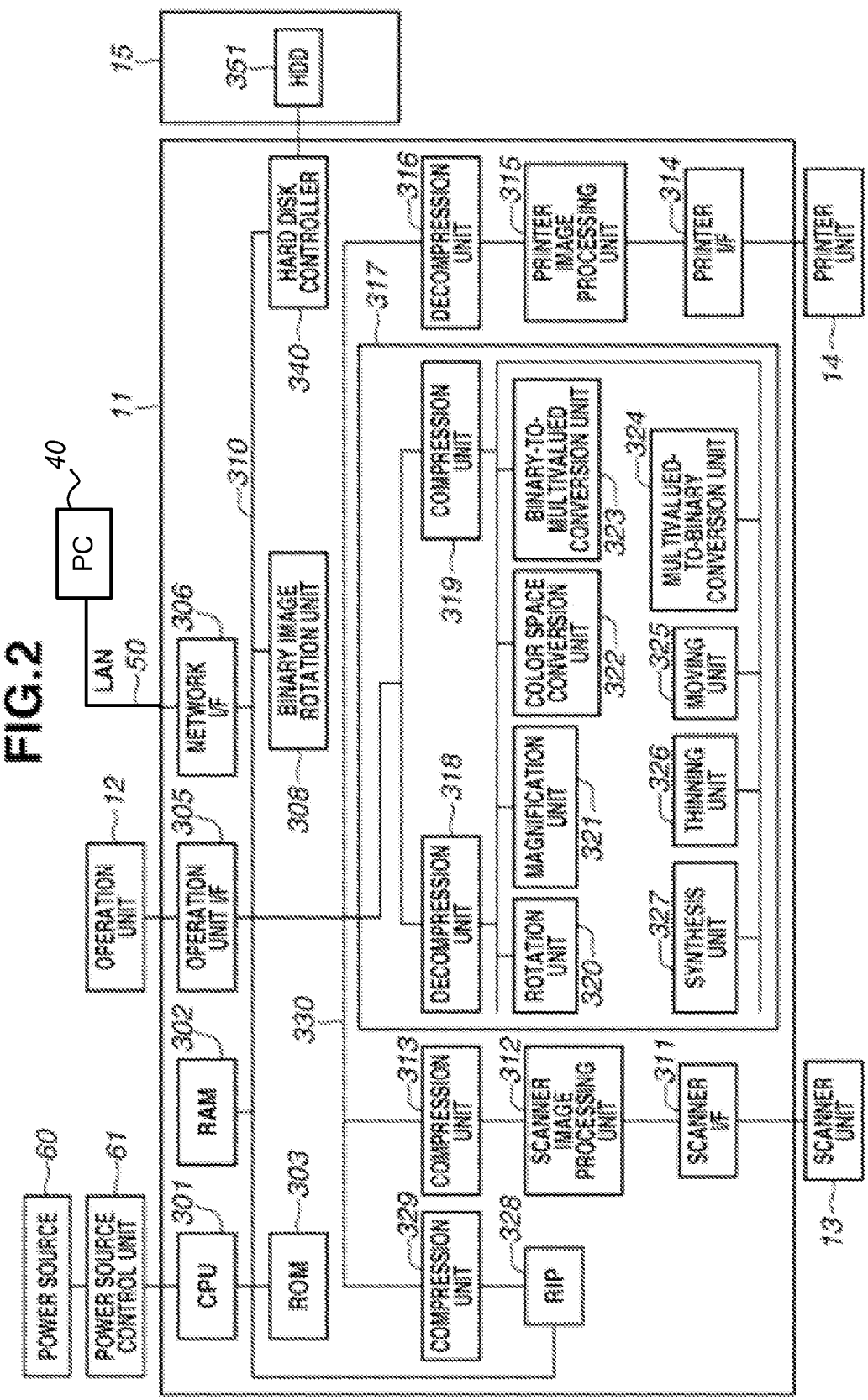
FIG. 2 is a block diagram illustrating a configuration of a controller in the image forming apparatus according to an exemplary embodiment of the present invention.

FIG. 2 is a block diagram illustrating a configuration of a controller in the image forming apparatus according to the exemplary embodiment of the present invention.

Referring to FIGS. 1 and 2, the image forming apparatus includes a scanner unit 13 and a printer unit 14.

The scanner unit 13 inputs into a charge-coupled device (CCD), reflected light acquired by scanning and exposing an image on a document, so that image information is converted into an electrical signal. The scanner unit 13 further converts the converted electrical signal into a luminance signal composed of red (R), green (G), and blue (B) colors and outputs the luminance signal as image data to a controller 11 (FIG. 2).

When a user instructs the image forming apparatus from an operation unit 12 (FIG. 2) to start reading, the controller unit 11 instructs the scanner unit 13 to read a document. The scanner unit 13 thus reads the document according to the instruction and outputs image data to the controller 11.

The controller 11 then performs image processing on the image data received from the scanner unit 13 and outputs the processed image data to the printer unit 14.

The printer unit 14 forms an image on paper based on the image data received from the controller 11.

Referring to FIG. 2, the controller unit 11 is electrically connected to the scanner unit 13 and the printer unit 14. The controller 11 is also connected to a personal computer (PC) and other external devices via a local area network (LAN) 50. The image data and device information can thus be input to and output from the controller 11.

A CPU 301 integrally controls access to connected devices and controls various processes performed inside the controller 11 based on a control program stored in a read-only memory (ROM) 303.

A random access memory (RAM) 302 is a system work memory for the CPU 301 to operate, and a memory for temporarily storing the image data. The RAM 302 includes a static (S) RAM in which stored contents are kept stored even after the power is switched off, and a dynamic (D) RAM in which the stored contents are deleted when the power is switched off. The ROM 303 stores a boot program of the image forming apparatus.

An operation unit interface (I/F) 305 is an interface for connecting a system bus 310 and the operation unit 12. The operation unit I/F 305 receives from the system bus 310 the image data to be displayed on the operation unit 12 and outputs the image data on the operation unit 12. The operation unit I/F 305 also outputs information input from the operation unit 12 to the system bus 310.

A network I/F 306 connects to the LAN 50 and the system bus 310 and inputs and outputs information. A binary image rotation unit 308 changes a direction of the image data before being transmitted.

A hard disk controller 340 converts an advanced technology attachment (ATA) signal of the hard disk and then connects to the system bus 310. A hard disk unit 15 is installed in the image forming apparatus as standard and includes a hard disk (HDD) 351 which is connected to the hard disk controller 340. The HDD 351 stores system software and the image data.

An image bus 330 formed of a protocol control information (PCI) bus is a transmission path for transmitting and receiving image data.

A scanner image processing unit 312 corrects, processes, and edits the image data received from the scanner unit 13 via the scanner I/F 311. The scanner image processing unit 312 determines whether the received image data is of a color document or a monochrome document, or of a text document or a photograph document, and adds the determination result to the image data. Such additional data is referred to as image area data. Processing performed by the scanner image processing unit 312 will be described in detail below.

A compression unit 313 receives the image data from the scanner image processing unit 312, divides the image data into block units of 32 pixels by 32 pixels, and compresses the image data.

An image conversion unit 317 performs image processing on the image data as necessary. In the image conversion unit 317, the image data is decompressed by a decompression unit 318. The decompressed image data is subjected to image processing as necessary by a rotation unit 320, a magnification unit 321, a color space conversion unit 322, a binary-to-multivalued conversion unit 323, a multivalued-to-binary conversion unit 324, a moving unit 325, a thinning unit 326, and a composing unit 327. The image-processed image data is then again compressed by a compression unit 319.

Further, a decompression unit 316 decompresses the image data and rasterizes the decompressed image data composed of a plurality of pieces of tile data. A printer image processing unit 315 then processes the rasterized image data and transmits the processed data to the printer unit 14 via a printer I/F 314.

The image forming apparatus according to the present exemplary embodiment also includes a power source control unit 61 (a second control unit) illustrated in FIG. 7 to be described below. The power source control unit 61 controls power supply to the controller unit 11 (a first control unit) and the printer unit 14.

Figure 3:
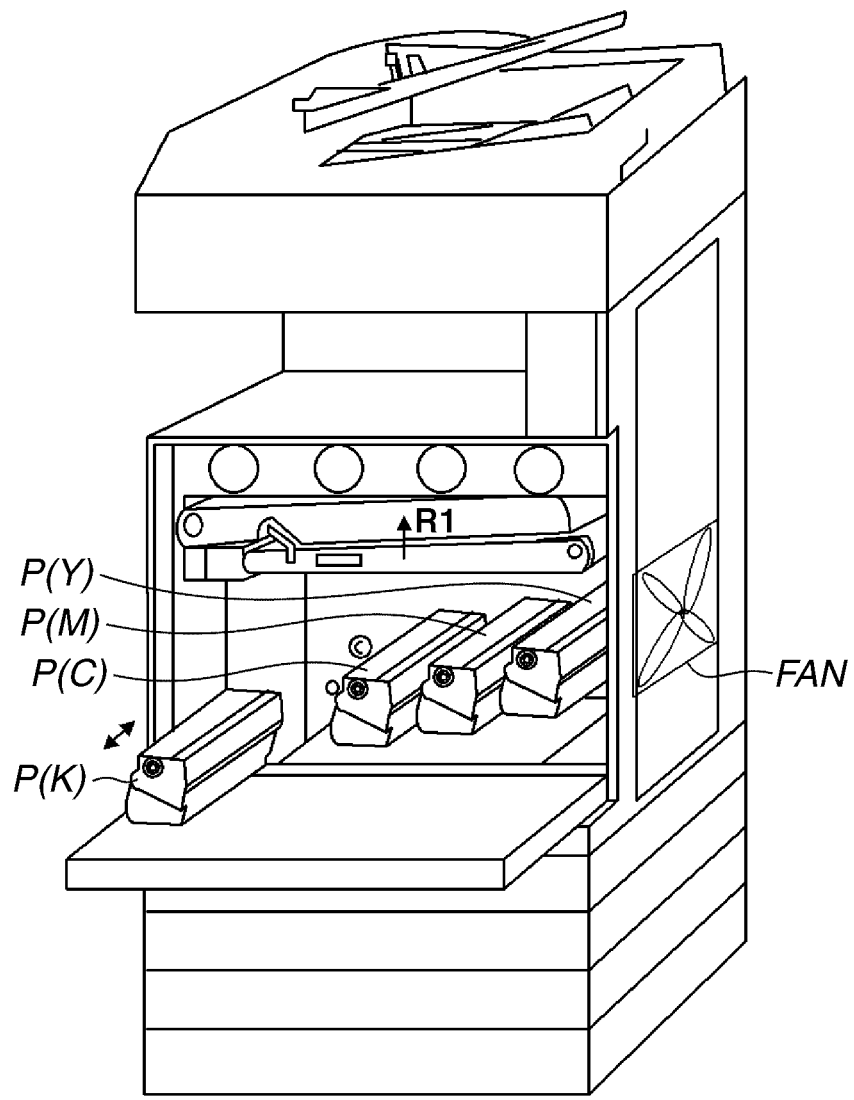
FIG. 3 illustrates a state where a front door of the printer unit illustrated in FIG. 1 is open.

FIG. 3 illustrates the image forming apparatus in which a front door of the printer unit 14 is open. The photosensitive drum and an image forming mechanism of the printer unit 14 will be described below with reference to FIG. 3.

Referring to FIG. 3, the process kits P(Y), P(M), P(C), and P(K) which generate yellow (Y), magenta (M), cyan (C), and black (K) images respectively are formed of the photosensitive drum and a developing unit.

Figure 5:
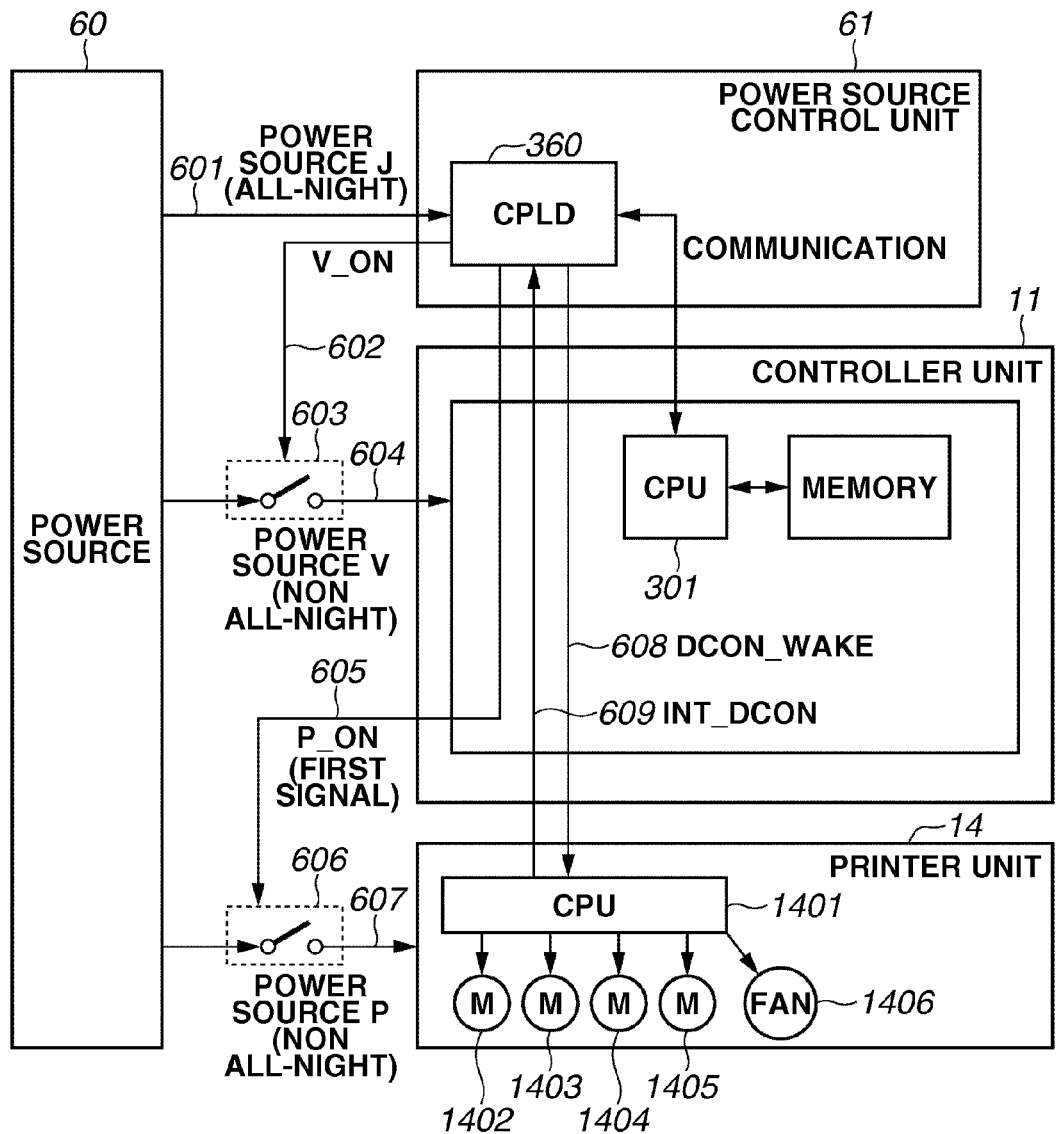
FIG. 5 is a block diagram illustrating a power source control configuration of the image forming apparatus in the present invention.

An exhaust fan FAN exhausts air inside the printer unit 14 (i.e., gas inside the image forming apparatus). The FAN is driven by a motor 1406 (refer to FIG. 5) via a gear drive mechanism (not illustrated). The motor 1406 is controlled by a CPU 1401 of the printer unit 14 as illustrated in FIG. 5 to be described below.

Figure 4:
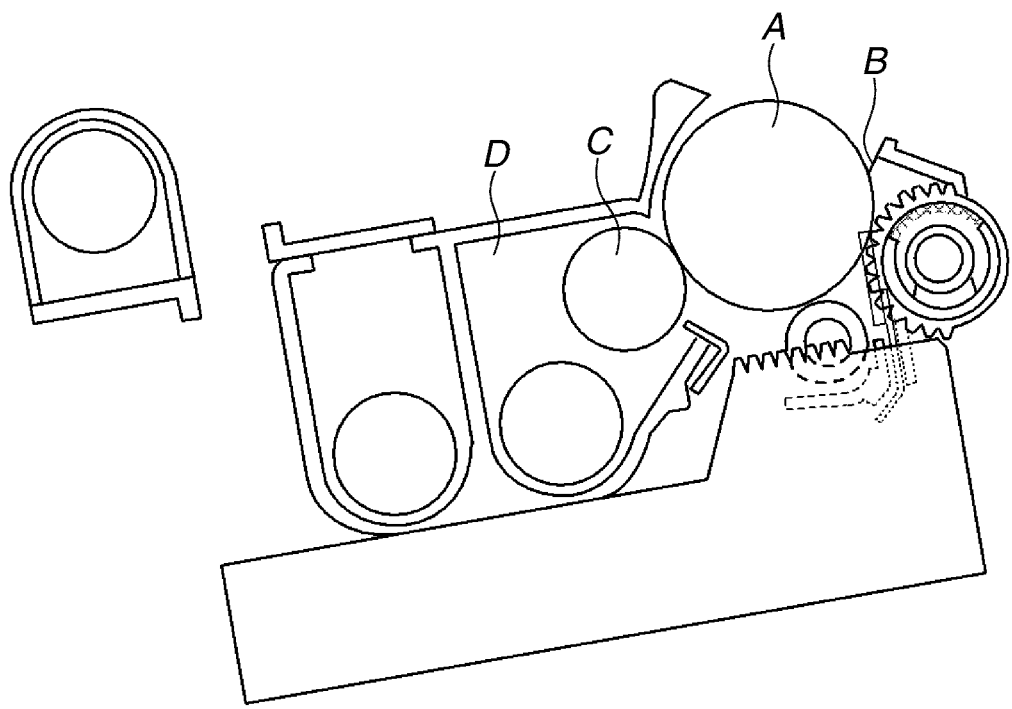
FIG. 4 is a cross-sectional view illustrating process kits P(Y), P(M), P(C), and P(K) illustrated in FIG. 3.

FIG. 4 illustrates a cross-sectional view of the process kits P(Y), P(M), P(C), and P(K).

Referring to FIG. 4, the process kit includes a photosensitive drum A and a cleaning blade B that is in contact with the photosensitive drum A. The cleaning blade B removes residual toner from the photosensitive drum A in the image forming process.

Further, a developing sleeve C is magnetized and is set to have a potential with respect to the photosensitive drum A. The toner inside a developing unit D is thus attached to the photosensitive drum A via the developing sleeve C.

The photosensitive drum A and the developing sleeve C are driven by a motor via a gear drive mechanism (not illustrated). The motors are provided for each color (Y, M, C, and K) and correspond to circuits 1402, 1403, 1404, and 1405 illustrated in FIG. 5. The motors are controlled by the CPU 1401 of the printer unit 14.

When the cleaning blade B is in contact with the photosensitive drum A for a long time, an imprint is generated on the photosensitive drum A, which may cause a striped image to be developed on the photosensitive drum A. However, development of the striped image can be prevented by rotating the photosensitive drum A at predetermined time intervals (for example, 15 minutes) and shifting the contact position of the cleaning blade B on the photosensitive drum A.

A copy operation performed by the image forming apparatus will be described below with reference to FIG. 2.

The document read by the scanner unit 13 is transmitted as the image data to the scanner image processing unit 312 via the scanner I/F 311. The scanner image processing unit 312 then performs scanner image processing on the image data.

The compression unit 313 divides the processed image data into block units of 32 pixels by 32 pixels and generates tile data. Further, the compression unit 313 compresses the image data composed of the plurality of pieces of the tile data. The image data compressed by the compression unit 313 is then transmitted to and stored in the RAM 302. The stored image data is transmitted to the image conversion unit 317 as necessary and processed, and again transmitted and stored in the RAM 302.

The data then read out from the RAM 302 is written in the hard disk 351 via the hard disk controller 340.

When the data is read out from the hard disk 351, the data is also transmitted to the bus 310 via the hard disk controller 340.

The image data is transmitted from the bus 310 to the decompression unit 316 which decompresses the image data and rasterizes the decompressed image data composed of the plurality of pieces of the tile data. The rasterized image data is transmitted to the printer image processing unit 315. The image data processed by the printer image processing unit 315 is then transmitted to the printer unit 314 via the printer I/F 314, and formed into an image on printing paper (recording paper) by the printer 14.

In the above-described operation, the image data is once written in the hard disk 351 based on the assumption that an operation region will become necessary for an operation to replace the pages or the like.

A postscript description language (PDL) print operation performed in the image forming apparatus will be described below with reference to FIG. 2.

PDL data transmitted from the PC 40 via the LAN 50 is transmitted to the RAM 302 via the network I/F 306 and stored in the RAM 302.

The CPU 301 then decodes the PDL data and transmits the resulting intermediate data to a raster image processor (RIP) 328. The RIP 328 renders the intermediate data and generates raster format image data which is transmitted to a compression unit 329. The compression unit 329 divides the image data into block units and compresses the image data which is then transmitted to the RAM 302.

The image data stored in the RAM 302 is read out and written in the hard disk 351. The image data retrieved from the bus 310 is transmitted to the printer unit 14 and thus formed into an image on the printing paper.

An operation of storing the data in a box performed by the image forming apparatus will be described below with reference to FIG. 2.

The document read by the scanner 13 is transmitted as the image data to the scanner image processing unit 312 via the scanner I/F 311. The scanner image processing unit 312 then performs scanner image processing on the image data.

The compression unit 313 then divides the image data into block units of 32 pixels by 32 pixels and generates the tile data. Further, the compression unit 313 compresses the image data composed of a plurality of pieces of the tile data. The image data compressed by the compression unit 313 is then transmitted to and stored in the RAM 302. The stored image data is transmitted to the image conversion unit 317 as necessary and processed, and again transmitted and stored in the RAM 302.

The data is then read out from the RAM 302, and a file name is added to the data according to a user setting. The data is thus written in a predetermined directory on the hard disk.

A procedure of intermittently rotating the photosensitive drum when the multifunction peripheral has shifted from a normal power mode to a power saving mode after stopping to operate will be described below.

FIG. 5 is a block diagram illustrating the power source control configuration of the image forming apparatus in the present invention. Components which are similar to those in FIG. 2 are assigned the same reference numerals.

Referring to FIG. 5, a power source 60 constantly supplies power (i.e., power source J (all-night) 601) to the power source control unit 61. The power control unit 61 is configured of an element which consumes very little power. The power source control unit 61 is kept switched on even during the power saving mode and controls the power supply to the controller unit 11 (controller unit) and the printer unit 14 (printer unit).

The controller unit 11 and the printer unit 14 illustrated in FIG. 5 can communicate with each other as illustrated in FIG. 2. When the image forming apparatus is operating in the normal power mode, the power source controlling unit 61 controls the power source 60 so that the controller unit 11 can control the printer unit 14 in the normal power state. More specifically, when the image forming apparatus is operating in the normal power mode, the controller unit 11 can control the rotation of the photosensitive drum of the printer unit and the rotation of the exhaust fan FAN. On the other hand, when the image forming apparatus is operating in the power saving mode, the power source controlling unit 61 controls the power source 60 so that the controller unit 11 cannot control the printer unit 14 in the power saving state. In the power saving state, power is not supplied to the controller unit 11.

The power supply control unit 61 includes a complex programmable logic device (CPLD) 360. The CPLD is a programmable electric circuit and is previously programmed to execute a desired operation described below.

The CPU 301 communicates with the CPLD 360 to set a plurality of timer values to the CPLD 360, and when a timer is activated, the CPLD 360 performs an operation set by the CPU 301. Further, the CPLD 360 can operate a predetermined input and output (IO) signal according to an instruction from the CPU 301.

A DCON_WAKE signal 608 (activation control signal) is an IO signal which is connected to the CPU 1401 of the printer unit 14. If the printer unit 14 is switched on while the DCON_WAKE signal 608 is asserted (ON state), the printer unit 14 becomes activated in a mode that only performs roller rotation (i.e., a heat exhaustion process in a second exemplary embodiment) which is a specific operation (maintenance operation). The printer unit 14 thus does not perform a product operation of the multifunction peripheral. On the other hand, if the printer unit 14 is switched on while the DCON_

WAKE signal 608 is negated (OFF state), the printer unit 14 is activated in a mode that executes the product operation of the multifunction peripheral.

A V_ON signal 602 opens and closes a switch 603, thereby controlling the power supply (i.e., a power source V (non all-night) 604) to the controlling unit 11.

A P_ON signal 605 opens and closes a switch 606, thereby controlling the power supply (i.e., a power source P (non all-night) 607) to the printer unit 14.

An INT_DCON signal 609 is transmitted from the CPU 1401 of the printer unit 14 to the power source control unit 61. When the CPU 301 in the controller unit 11 is not operating and the printer unit 14 is operating, the CPU 1401 of the printer unit 14 transmits the INT_DCON signal 609 to notify the power source control unit 61 of, for example, a roller temperature anomaly or abnormality such as motor stop.

The image forming apparatus shifts to the power saving mode after a predetermined time period (e.g., 4 minutes) has passed from completion of the various processes such as the copy operation, the PDL print operation, and storing in the box. The image forming apparatus also shifts to the power saving mode when the user instructs shutdown of the controller unit 11 (i.e., shifting to the power saving mode) via the operation unit 12.

An example of an operation performed by the image forming apparatus according to the present exemplary embodiment will be described below with reference to FIGS. 6, 7, and 8.

Figure 9:
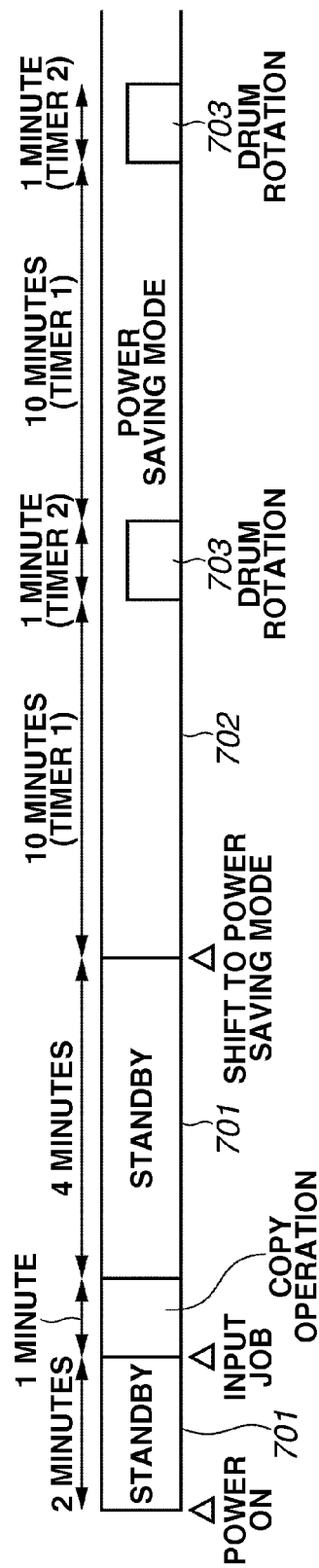
FIG. 9 illustrates status transition of the image forming apparatus according to a first exemplary embodiment of the present invention.

Further, FIG. 9 illustrates a status transition of the image forming apparatus according to the present exemplary embodiment.

Figure 6:
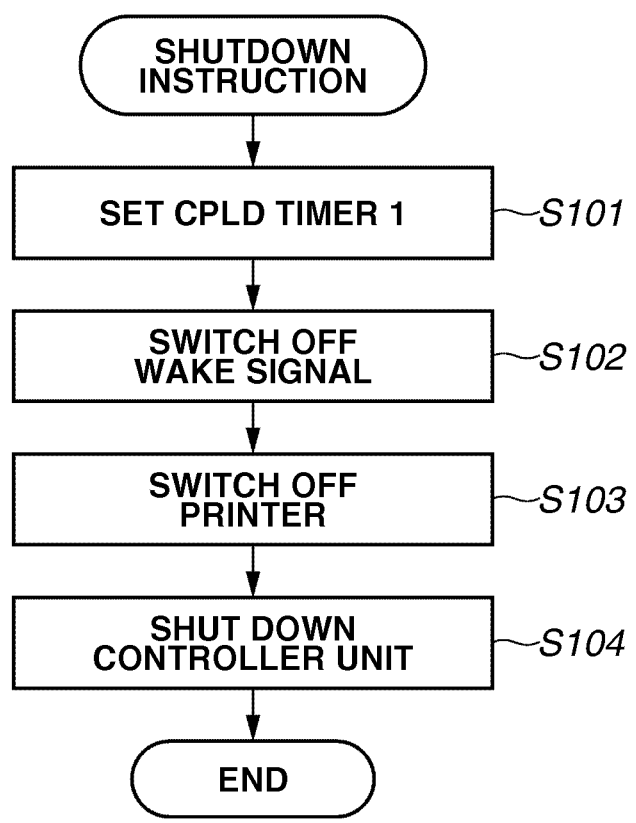
FIG. 6 is a flowchart illustrating a sequence for shifting to the power saving mode performed by the CPU in the controller unit.

FIG. 6 is a flowchart illustrating a sequence for shifting to the power saving mode performed by the CPU 301 in the controller unit 11. The process illustrated in the flowchart is realized by the CPU 301 in the controller unit 11 executing a program stored in the ROM 303.

The CPU 301 in the controller unit 11 determines to shift to the power saving mode after an operation (i.e., product operation of the multifunction peripheral such as printing) has ended and a predetermined time has passed, or by receiving a user instruction. In such a case, the process proceeds to step S101.

In step S101, the CPU 301 in the controller unit 11 sets a predetermined value (e.g., 10 minutes) to a value of "timer 1" in the CPLD 360. Thus, the timing at which the post-processing is performed in the printer 14 can be set (i.e., a timing setting step).

In step S102, the CPU 301 in the controller unit 11 negates (switches off) the DCON_WAKE signal via the CPLD 360.

In step S103, the CPU 301 in the controller unit 11 negates the P_ON signal via the CPLD 360 and switches off the printer (i.e., turn off printer).

In step S104, the CPU 301 in the controller unit 11 shuts down the controller unit 11. The V_ON signal is thus negated and the power supply to the controller unit 11 is cut. In other words, the image forming apparatus shifts to the power saving mode (i.e., a status 702 illustrated in FIG. 9).

Figure 7:
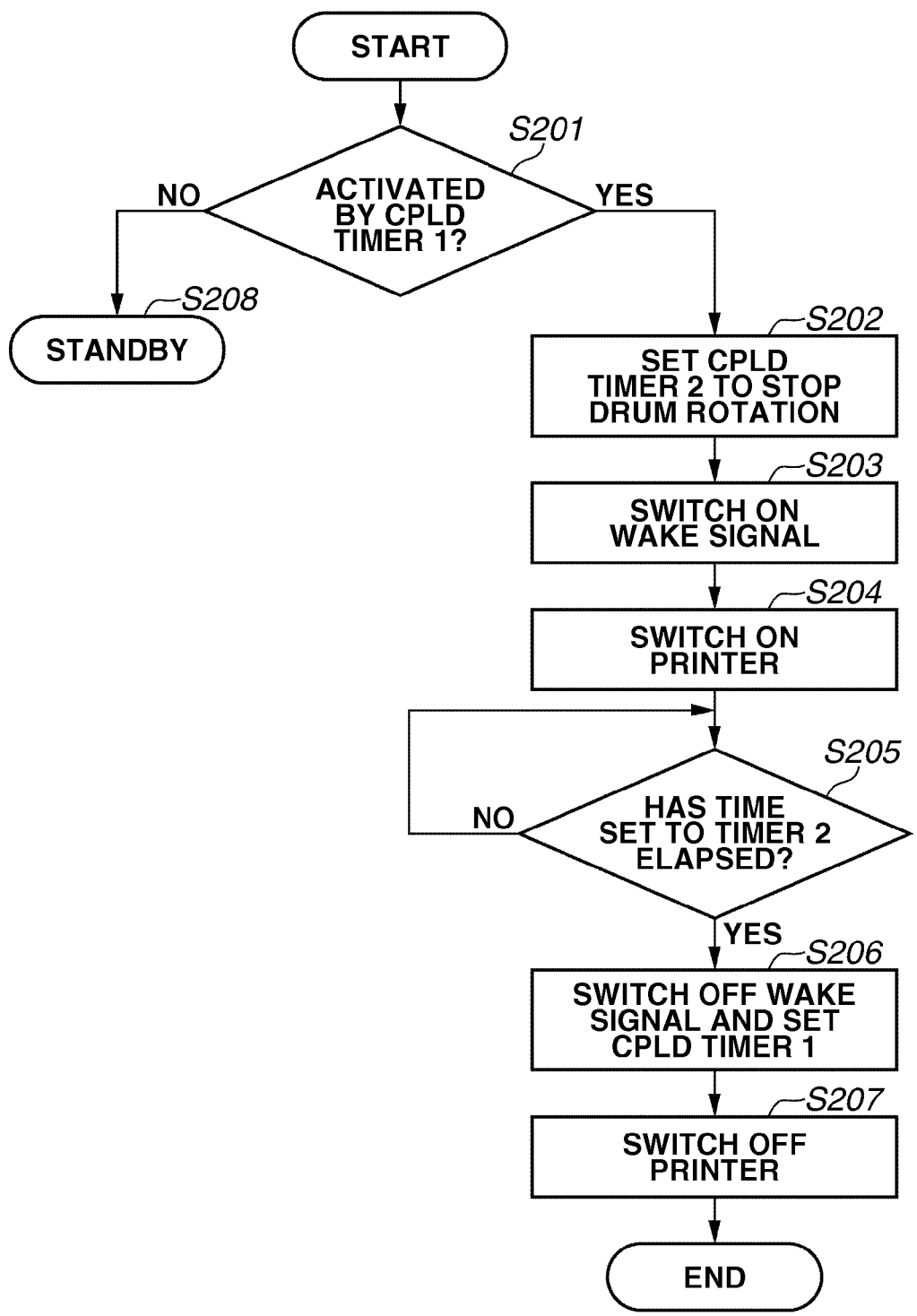
FIG. 7 is a flowchart illustrating a sequence for rotating a photosensitive drum to prevent a striped image from being formed on the photosensitive drum.

The CPLD 360 in the power source control unit 61 then starts the process illustrated in FIG. 7 based on an activation factor that the time set to the "timer 1" has elapsed.

FIG. 7 is a flowchart illustrating a sequence for rotating the photosensitive drum A to prevent a striped image from being formed on the photosensitive drum A. The process illustrated in the flowchart is realized by the CPLD 360 of the power source control unit 61 operating based on a program (logic circuit) recorded inside the CPLD 360.

Upon generation of the activation factor, the CPLD 360 proceeds the process to step S201.

In step S201, the CPLD 360 determines using a logic inside the CPLD 360 whether the operation is activated by the "timer 1" therein. If the CPLD 360 determines that the operation is not activated by the "timer 1" (NO in step S201), the process proceeds to step S208. In step S208, the image forming apparatus shifts to a normal standby status (i.e., status 701 in FIG. 9).

On the other hand, if the CPLD 360 determines that the operation is activated by the "timer 1" (YES in step S201), the process proceeds to step S202.

In step S202, the CPLD 360 sets a predetermined value (e.g., "1 minute") to a value of "timer 2".

In step S203, the CPLD 360 then asserts (switches on) the DCON_WAKE signal.

In step S204, the CPLD 360 further asserts (switches on) the P_ON signal and starts supplying power to the printer unit 14 (i.e., switches on the printer). Accordingly, the printer unit 14 is activated and performs the process illustrated in FIG. 8.

In step S205, the CPLD 360 stands by until the time set to the "timer 2" elapses. When the time set to the "timer 2" elapses (YES in step S205), the process proceeds to step S206.

In step S206, the CPLD 360 negates (switches off) the DCON_WAKE signal and sets a predetermined value (e.g., "10 minutes") to the "timer 1". Thus, the timing at which the post-processing is performed in the printer 14 can be set (i.e., a timing setting step).

In step S207, the CPLD 360 negates the P_ON signal and stops supplying power to the printer unit 14 (i.e., switches off the printer). The CPLD 360 then again boots the process illustrated in FIG. 7 based on the activation factor that the time set to the "timer 1" has elapsed. In other words, the photosensitive drum of the printer 14 is caused to be rotated at regular intervals.

Figure 8:
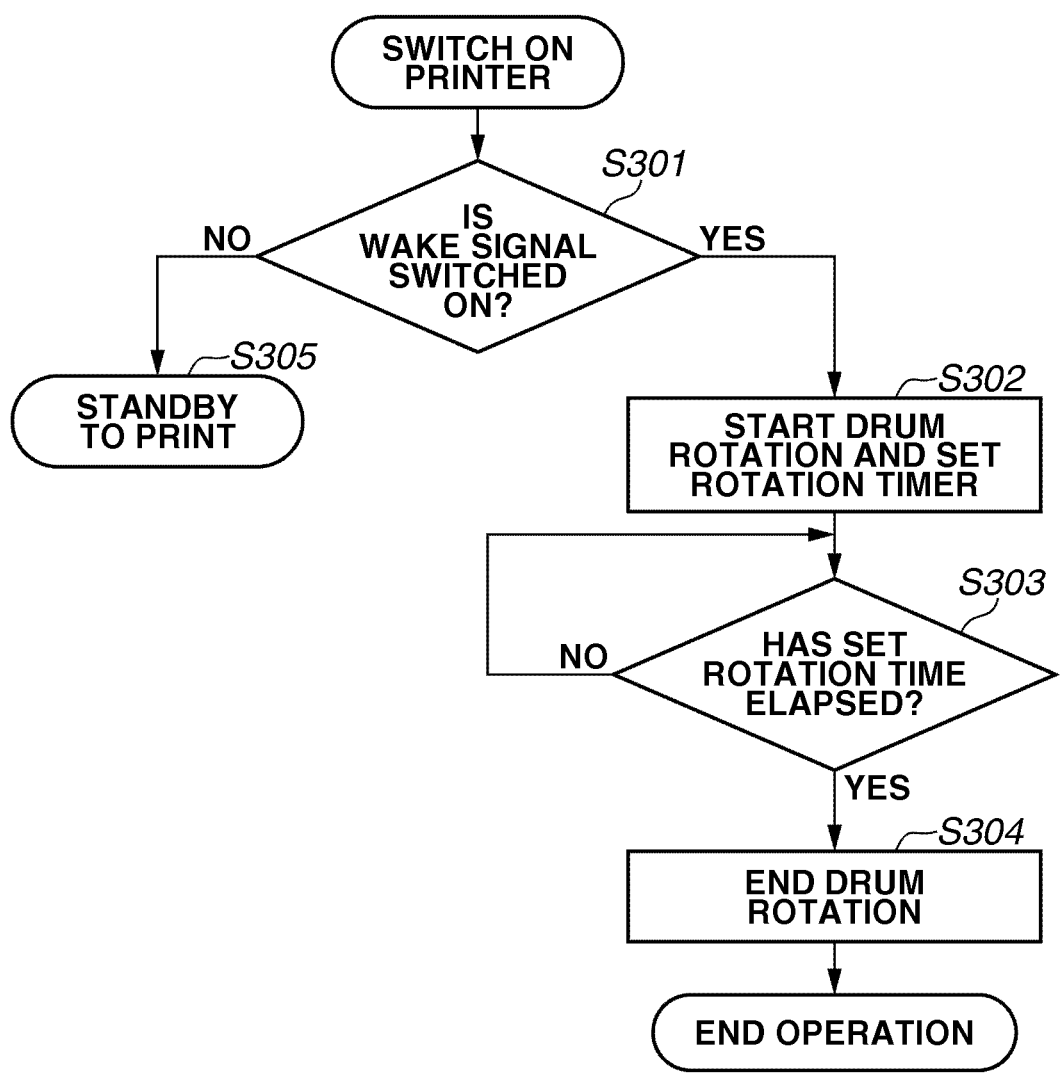
FIG. 8 is a flowchart illustrating a sequence for causing the printer unit to rotate the photosensitive drum during the power saving mode.

FIG. 8 is a flowchart illustrating a sequence for causing the printer unit 14 to rotate the photosensitive drum A during the power saving mode. The process illustrated in the flowchart is realized by the CPU 1401 of the printer unit 14 executing a program stored in a ROM (not illustrated).

When the printer unit 14 is switched on (i.e., step S204 illustrated in FIG. 7) and activated, the CPU 1401 of the printer unit 14 proceeds the process to step S301.

In step S301, the CPU 1401 of the printer unit 14 determines whether the DCON_WAKE signal is asserted (i.e., on). If the DCON_WAKE signal is not asserted (NO in step S301), the process proceeds to step S305. In step S305, the printer unit 14 shifts to a print standby status.

On the other hand, if the DCON_WAKE signal is asserted (YES in step S301), the process proceeds to step S302.

In step S302, the CPU 1401 of the printer unit 14 shifts to a "photosensitive drum rotation mode" which is a special mode and rotates the photosensitive drum A. The CPU 1401 of the printer unit 14 also sets a predetermined value (e.g., "1 minute") to a "rotation timer".

In the photosensitive drum rotation mode, an operation is performed to prevent the striped image to be developed on the photosensitive drum A. The striped image is generated by an imprint remaining on the photosensitive drum A generated by the cleaning blade B being in contact with the photosensitive drum A for a long time. The CPU 1401 of the printer unit 14 shifts to the photosensitive drum rotation mode at predetermined time intervals and rotates the photosensitive drum A to prevent development of the striped image.

In step S303, the CPU 1401 of the printer unit 14 stands by until the time set to the "rotation timer" has elapsed and rotates the photosensitive drum A as necessary (i.e., status 703 illustrated in FIG. 9).

When the time set to the "rotation timer" has elapsed (YES in step S303), the process proceeds to step S304. In step S304, the CPU 1401 of the printer unit 14 stops rotating the photosensitive drum A, and the process ends.

The post-processing operation of the printer will be summarized below.

The post-processing operation of the printer is performed by rotating rollers in the printer at predetermined time intervals as will be described below.

When the image forming apparatus is in a sleep mode, the CPLD 360 asserts the P_ON signal while asserting the DCON_WAKE signal. The printer is thus turned on.

The printer unit 14 is configured to perform the operation from boot-up to rotating the roller and end rotating the roller within a predetermined time when the printer is switched on while the DCON_WAKE signal is switched on as described above.

The timer of the CPLD 360 in the power source control unit 61 is set by previously considering the operation time of the printer unit 14. The timer is thus set so that the printer is switched off after sufficient time has elapsed from the end of roller rotation, and to repeat such operation.

When the CPU 301 in the controller unit 11 is not operating and only the printer unit 14 is operating as described above, it may becomes necessary for the printer unit 14 to notify of, for example, a roller temperature anomaly or abnormality such as motor stop. In such a case, the printer unit 14 asserts the INT_DCON signal and notifies the CPLD 360 of the abnormality. In response, the CPLD 360 asserts the V_ON signal, so that the CPU 301 in the controller unit 11 can be activated. The CPU 301 in the controller unit 11 can then receive the notification on the abnormality from the printer unit 14 and make a response, such as display a message on the operation panel. More specifically, if the CPLD 360 of the power source control unit 61 receives a notification on the abnormality from the printer unit 14 while performing the specific operation (i.e., the post-processing operation), the CPLD 360 starts supplying power to the controller unit 11 and activates the controller unit 11.

An operation performed when a print job is input to the printer unit 14 while the rollers are being rotated will be described below.

When a job is input, a job input instruction is transmitted to the CPLD 360, and the CPU 301 in the controller unit 11 is notified of activation by the job. The CPLD 360 negates the DCON_WAKE signal, once negates the P_ON signal, and then asserts the P_ON signal. Therefore, the printer unit 14 operating in the specific mode (i.e., photosensitive drum rotation mode) is once turned off (i.e., the printer post-processing operation is suspended). The printer unit 14 is thus again activated in the product operation mode, and the input job can be performed.

The power source 60 supplies power to the network controller (i.e., network I/F 306 illustrated in FIG. 2) even when the image forming apparatus is in the power saving mode (not illustrated in FIG. 5).

The network controller is configured to directly respond to a specific packet when the image forming apparatus is in the power saving mode. In such a case, the post-processing of the printer unit 14 is continued without activating the controller 11.

On the other hand, if the network controller receives a packet which requires the controller unit 11 to be activated, the network controller activates the controller unit 11 via the CPLD 360. If such packet which requires activating the controller unit 11 is a print job to be input to the printer unit 14, the post-processing of the printer unit 14 is suspended as described above, and the print job is performed.

As described above, the image forming apparatus according to the present exemplary embodiment does not activate the CPU 301 in the controller unit 11 when performing post-processing of the printer. Instead, the image forming apparatus activates the power source control unit 61 configured of a low power consuming element. Further, the CPLD 360 of the power source control unit 61 activates the printer unit 14 using the timer and notifies that the printer unit 14 is in the post-processing operation mode. Therefore, the printer unit 14 can perform the post-processing operation by itself (without activating the controller unit 11).

Therefore, the maintenance operation of the printer unit 14 can be performed at regular time intervals without activating the controller unit 11 after the controller unit 11 is shut down. The power consumption during the maintenance operation of the printer unit 14 can thus be reduced as compared to the conventional operation. Further, since the controller unit 11 is not activated when the maintenance operation of the printer unit 14 is performed, the hard disk is not activated. Consequently, a number of activation of the hard disk can be reduced compared to the conventional apparatus, and a lifetime of the hard disk is prevented from becoming shortened due to an increase in the number of activation.

Furthermore, since the controller unit 11 is not activated when the maintenance operation of the printer 14 is performed, a movable hard disk which is connected to the controller unit 11 can be removed and stored after shifting to the power saving mode. User-friendliness can thus be improved.

A second exemplary embodiment of the present invention describes a method for realizing an operation mode in which ozone or residual heat of a fixing device remaining inside the image forming apparatus is exhausted.

If ozone remains inside the image forming apparatus, it may react with the photosensitive drum A and generate an image defect. Further, if residual heat of the fixing device remains inside the image forming apparatus, the toner may become adhered to the fixing device.

To solve such problems, it is necessary to set a mode in which, when the image forming apparatus is shut down, the gas inside the printer unit is exhausted for a predetermined time period according to length of a job or the temperature inside the apparatus. The exhaust fan FAN (illustrated in FIG. 3) exhausts the gas inside the apparatus.

Figure 10:
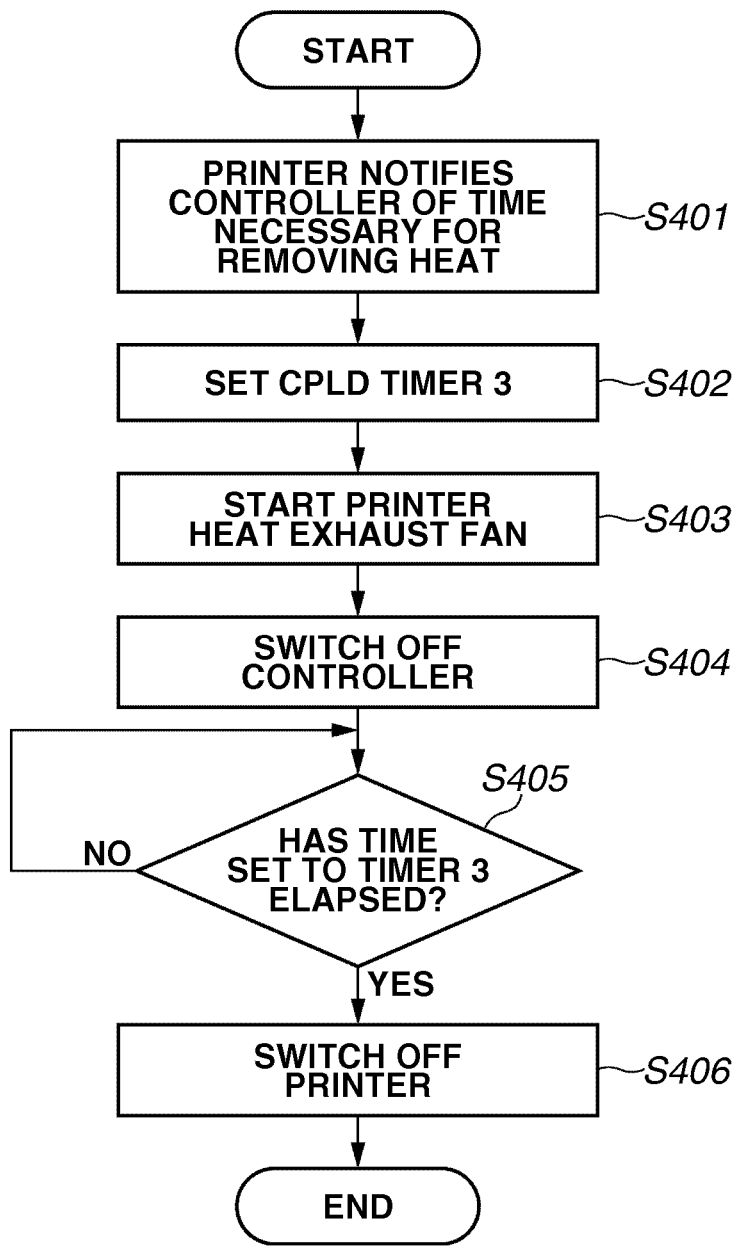
FIG. 10 is a flowchart illustrating an example of an operation of the image forming apparatus according to a second exemplary embodiment of the present invention.

FIG. 10 is a flowchart illustrating an example of an operation of the image forming apparatus according to the second exemplary embodiment of the present invention. The processes performed in step S401 and step S403 are realized by the CPU 1401 of the printer unit 14 executing a program stored in the ROM (not illustrated). Further, the process performed in step S402 is realized by the CPU 301 in the controller unit 11 executing a program stored in the ROM 303. Furthermore, the processes performed in step S404 to step S406 are realized by the CPLD 360 of the power source control unit 61 executing a program stored in a flash memory inside the CPLD 360.

Figure 11:
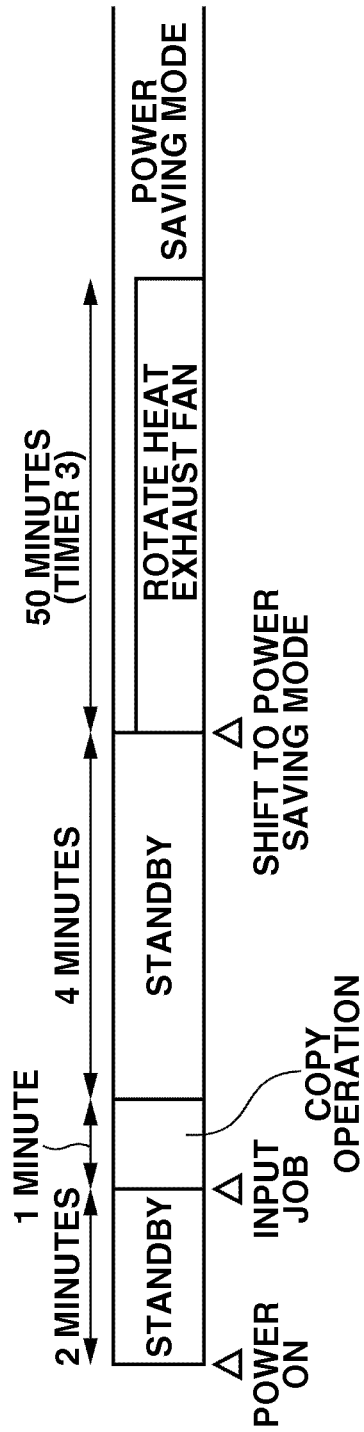
FIG. 11 illustrates a status transition of the image forming apparatus according to the second exemplary embodiment of the present invention.

FIG. 11 illustrates a status transition of the image forming apparatus according to the second exemplary embodiment of the present invention.

Referring to FIG. 10, in step S401, the CPU 1401 of the printer unit 14 notifies the controller unit 11, before shifting to the power saving mode, of a rotation time of the exhaust fan FAN (i.e., the drive time of the exhaust fan) which is necessary for removing the heat.

In step S402, upon receiving the notification, the CPU 301 in the controller unit 11 sets to a value of "timer 3" in the CPLD 360 the drive time (e.g., "50 minutes") of the exhaust fan notified from the controller unit 11 in step S401. Thus, the drive time of the exhaust fan can be set (drive time setting step).

In step S403, the CPU 1401 of the printer unit 14 starts rotating the exhaust fan in the power saving mode. Although the rotation of the exhaust fan in the power saving mode is started in step S403, since the exhaust fan FAN in the printer unit 14 is rotated while the image forming apparatus is switched on (i.e., not in the power saving mode), the exhaust fan FAN is continued to be rotated by the process performed in step S403. In other words, the printer unit 14 continues to rotate the exhaust fan FAN even when the printer unit 14 recognizes shifting to the power saving mode.

In step S404, the CPLD 360 negates the V_ON signal and switches off the controller unit 11.

In step S405, the CPLD 360 stands by until the time set to the "timer 3" elapses. When the CPLD 360 determines that the time set to the "timer 3" has elapsed (YES in step S405), the process proceeds to step S406.

In step S406, the CPLD 360 negates the P_ON signal and switches off the printer unit 14.

In the present exemplary embodiment, since the controller unit 11 is not activated while the maintenance operation of the printer unit 14 is performed in the power saving mode, power consumption can be reduced compared to the conventional apparatus. Further, since the controller unit 11 is not activated when the maintenance operation of the printer unit 14 is performed, the hard disk is not activated. Consequently, the number of activation of the hard disk can be reduced compared to the conventional apparatus, and the lifetime of the hard disk is prevented from becoming shortened due to an increase in the number of activation.

Furthermore, since the controller unit 11 is not activated when the maintenance operation of the printer 14 is performed, a movable hard disk which is connected to the controller unit 11 can be removed and stored after shifting to the power saving mode. User-friendliness can thus be improved.

In the first exemplary embodiment, the operation mode of the printer unit 14 is determined based on a level of the DCON_WAKE signal (on or off) when the printer unit 14 is activated.

In a third exemplary embodiment of the present invention, a plurality of levels can be set to the DCON_WAKE signal. For example, when the printer unit 14 is activated, the CPU 1401 of the printer unit 14 performs control so that if the level of the DCON_WAKE signal is "1 V", the printer unit 14 is activated in the roller rotation mode. Further, if the level is "2 V", the printer unit 14 is activated in another operation mode.

Furthermore, the DCON_WAKE signal and a pulse signal can be combined to classify the operation mode when the printer unit 14 is activated. More specifically, when the printer unit 14 is activated, the CPU 1401 of the printer unit 14 performs control so that if the DCON_WAKE signal is a first pulse signal pattern, the printer unit 14 is activated in the roller rotation mode. Moreover, if the DCON_WAKE signal is a second pulse signal pattern, the printer unit 14 is activated in another operation mode.

Figure 12:
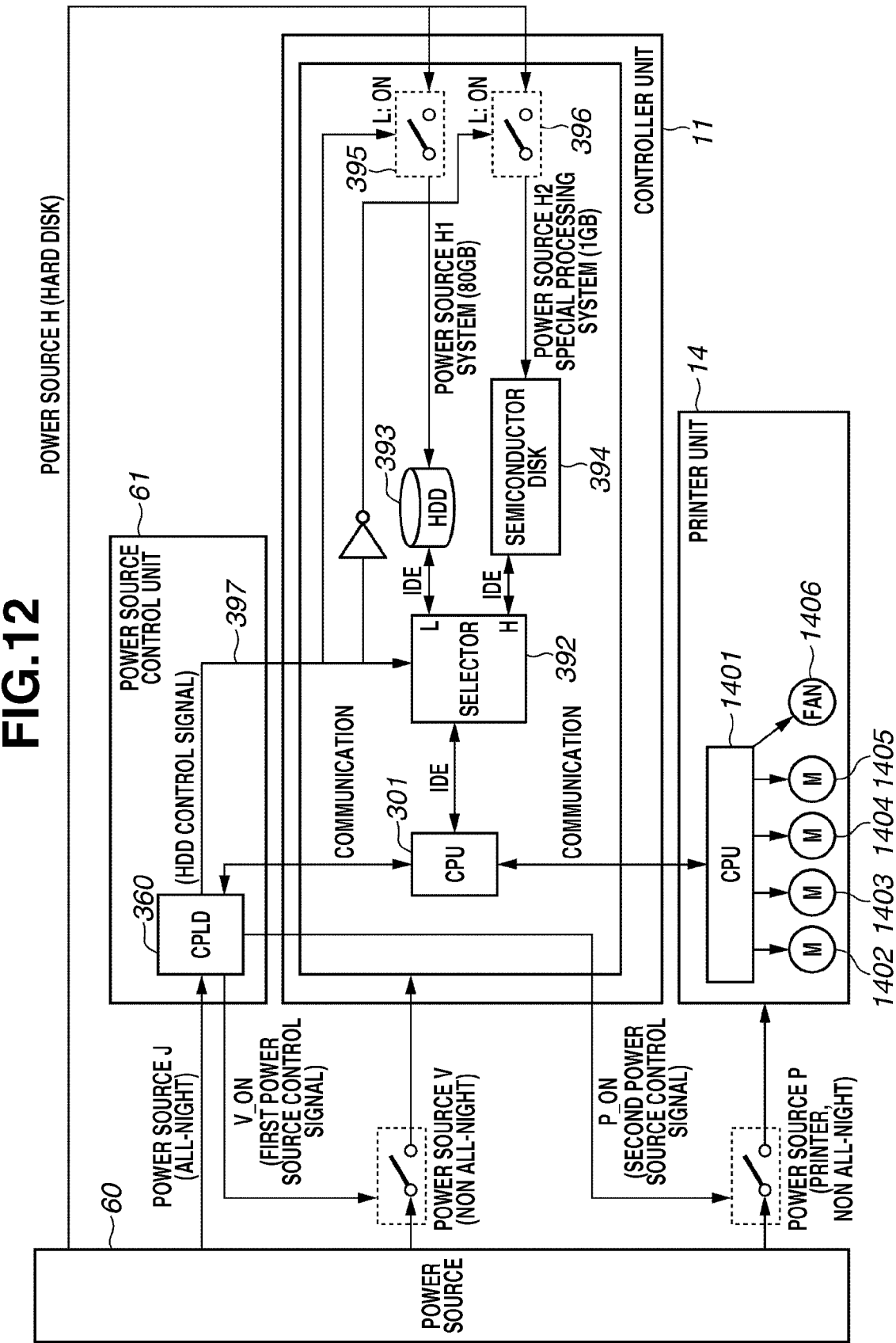
FIG. 12 is a block diagram illustrating a configuration of the controller unit in the image forming apparatus according to a fourth exemplary embodiment of the present invention.

FIG. 12 is a block diagram illustrating a configuration of the controller unit 11 in the image forming apparatus according to a fourth exemplary embodiment of the present invention. The elements similar to those illustrated in FIG. 5 are assigned the same reference numerals.

Referring to FIG. 12, the CPU 301 is connected to the hard disk by an integrated drive electronics (IDE) connection. More specifically, an IDE selector 392 can switch between an IDE signal of a hard disk 393 (a magnetic storage device) and an IDE signal of a semiconductor disk 394 (a semiconductor storage device). An HDD control signal (selection control signal) 397 output from the CPLD 360 controls the switching between the IDE signals by the IDE selector 392. The IDE selector 392 selects the hard disk 393 when the HDD control signal 397 is a first level (e.g., on), and selects the semiconductor disk 394 when the HDD control signal 397 is a second level (e.g., off). Further, the HDD control signal 397 is connected to switches 395 and 396 which switch between supplying power to the hard disk 393 and to the semiconductor disk 394 in synchronization with the switching of the IDE selector 392.

In the present exemplary embodiment, the hard disk 393 and the semiconductor disk 394 are provided as two types of a boot disk for activating the controller 11. The disk to be used in activating the controller 11 is selected according to the activating factor of the system.

The hard disk 393 is a large capacity disk (e.g., 80 GB) which stores a system program for using the apparatus as a product (i.e., a program for controlling normal functions for using the apparatus as a product) and the user data. Since an on/off frequency is specified in the lifetime of the hard disk, it is unsuitable to frequently switch on and off the hard disk. In contrast, a semiconductor disk is durable to being frequently switched on and off.

However, the capacity of the semiconductor disk cannot be increased in terms of cost. In the present exemplary embodiment, the capacity of the semiconductor disk 394 is 1 GB. The semiconductor disk 394 thus stores small capacity programs including a program for controlling the specific operation (maintenance operation) of the printer unit 14, such as regular rotation of the photosensitive drum during the power saving mode or exhaustion of gas inside the apparatus after a job.

The controller unit 11 can be activated in the normal mode (a first mode) activated by a program read from the hard disk 393. The controller unit 11 can also be activated in the maintenance operation mode (a second mode) activated by a program read from the semiconductor disk 394.

An example of an operation performed by the image forming apparatus according to the present exemplary embodiment will be described below with reference to FIGS. 13 and 14.

Figure 13:
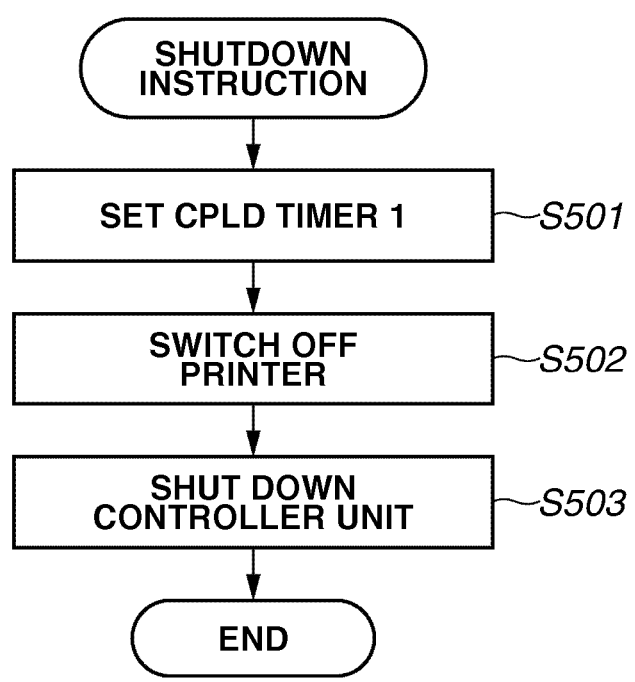
FIG. 13 is a flowchart illustrating a sequence for shifting to the power saving mode performed by the CPU in the controller unit.

FIG. 13 is a flowchart illustrating a sequence for shifting to the power saving mode performed by the CPU 301 in the controller unit 11. The process illustrated in the flowchart is realized by the CPU 301 in the controller unit 11 executing a program stored in the ROM 303.

The CPU 301 in the controller unit 11 determines to shift to the power saving mode after an operation (i.e., product operation of the multifunction peripheral such as printing) has ended and a predetermined time has passed, or by receiving a user instruction. In such a case, the process proceeds to step S501.

In step S501, the CPU 301 in the controller unit 11 sets a predetermined value (e.g., 10 minutes) to a value of the "timer 1" in the CPLD 360.

In step S502, the CPU 301 in the controller unit 11 negates the P_ON signal via the CPLD 360 and switches off the printer (i.e., turn off printer).

In step S503, the CPU 301 in the controller unit 11 shuts down the controller unit 11. The V_ON signal is thus negated and the power supply to the controller unit 11 is cut. In other words, the image forming apparatus shifts to the power saving mode.

Figure 14:
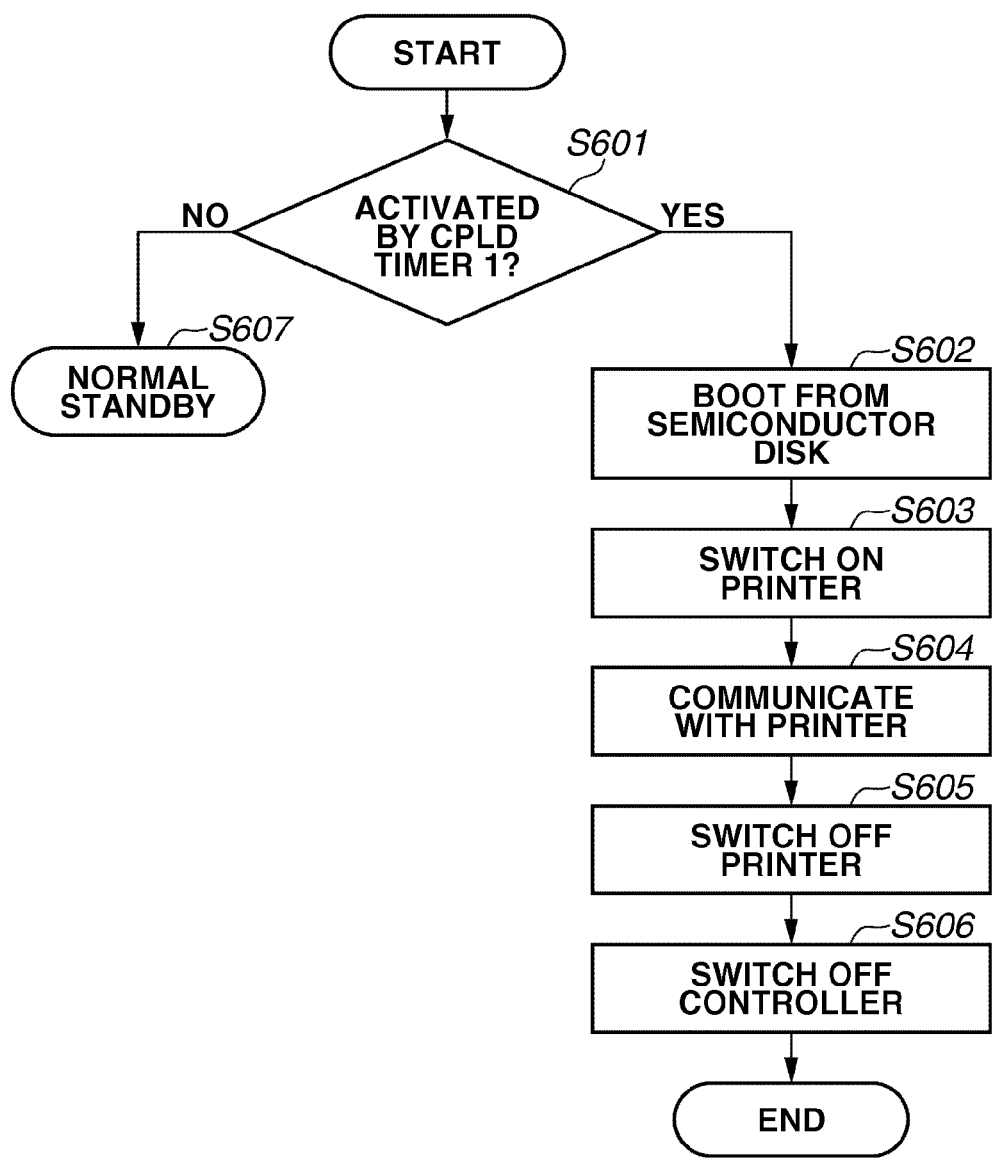
FIG. 14 is a flowchart illustrating a sequence for rotating the exhaust fan.

The CPLD 360 then starts performing the process illustrated in FIG. 14 based on the activation factor that the time set to the "timer 1" has elapsed.

FIG. 14 is a flowchart illustrating a sequence for rotating the exhaust fan FAN. The processes performed in step S601 and S602 illustrated in FIG. 14 are realized by the CPLD 360 in the power source control unit 61 executing a program stored in a flash memory inside the CPLD 360. Further, the processes performed in step S603 to step S606 illustrated in FIG. 14 are realized by the CPU 301 in the controller unit 11 executing a program stored in the ROM 303.

Upon generation of the activation factor, the CPLD 360 proceeds the process to step S601.

In step S601, the CPLD 360 determines using the logic inside the CPLD 360 whether the operation has been activated by the "timer 1" therein. If the CPLD 360 determines that the operation has not been activated by the "timer 1" (NO in step S601), the process proceeds to step S607. In step S607, the image forming apparatus shifts to the normal standby status. More specifically, the CPLD 360 sets the HDD control signal 397 to the first level, selects the hard disk 393 as the activating device, and asserts the V_ON signal. The CPLD 360 thus starts supplying power to the printer unit 14. Consequently, the CPU 301 in the controller unit 11 reads out and executes the boot program from the hard disk 393 and becomes activated (in the normal mode). The controller unit 11 then shifts to the normal standby status.

On the other hand, if the CPLD 360 determines that the operation has been activated by the "timer 1" (YES in step S601), the process proceeds to step S602.

In step S602, the CPLD 360 sets the HDD control signal 397 to the second level, selects the semiconductor disk 394 as the activating device, and asserts the V_ON signal. The CPLD 360 thus starts supplying power to the printer unit 14. Consequently, the CPU 301 in the controller unit 11 reads out and executes the boot program from the semiconductor disk 394 and becomes activated (in the maintenance operation mode). The CPU 301 in the controller unit 11 thus executes the process according to the program read out from the semiconductor disk 394.

In step S603, the CPU 301 in the controller unit 11 asserts (switches on) the P_ON signal via the CPLD 360 and starts supplying power to the printer unit 14 (i.e., switches on the printer). The printer unit 14 is thus activated.

In step S604, the CPU 301 in the controller unit 11 communicates with the printer unit 14 and causes the printer unit 14 to rotate the exhaust fan FAN for a predetermined time (e.g., 60 minutes). After rotating the exhaust fan FAN, the process proceeds to step S605.

In step S605, the CPU 301 in the controller unit 11 negates the P_ON signal via the CPLD 360 and shuts off the printer non all-night power source (i.e., switches off the printer).

In step S606, the CPU 301 in the controller unit 11 further negates the V_ON signal via the CPLD 360 and shuts off the controller non all-night power source (i.e., switches off the controller).

As described above, the CPU 301 in the controller unit 11 controls the CPLD 360 to perform the processes of step S605 and step S606. However, the CPLD 360 can also directly perform the processes. In such a case, after a predetermined time period has elapsed from when the controller 11 is booted from the semiconductor disk, the CPLD 360 negates the P_ON signal and the V_ON signal and shuts off the printer non all-night power source and the controller non all-night power source. The above-described predetermined time can be set by the controller 11 setting the timer of the CPLD 360.

Further, in the present exemplary embodiment, the semiconductor 394 stores a program (a degenerate program) for operating the system in a degenerate mode in which functions of normal product operation are limited. Furthermore, the CPLD 360 or the controller 11 includes an abnormality detection function for detecting an abnormality in the hard disk 393. If the abnormality detection function detects an abnormality in the hard disk 393 (such as a failure), power supply to the controller 11 is once stopped. The controller 11 is then activated in the degenerate mode using the degenerate program stored in the semiconductor disk 394.

As described above, according to the first to third exemplary embodiments, the CPLD 360 can control power supply to each device without activating the CPU 301 of the controller 11. The CPLD 360 can thus cause the printer unit 14 to perform the maintenance operation without activating the controller 11. Therefore, the power source control system can be simply configured, and the control can be simplified. Consequently, downsizing and lowering the cost of the image forming apparatus, as well as increasing the stability of the system can be realized.

According to the fourth exemplary embodiment, the controller 11 is activated from the semiconductor disk 394 (in the maintenance operation mode) and controls the printer unit 14 to execute the maintenance operation. Thus, a more flexible operation can be performed as compared to the first to third exemplary embodiments. Further, since it is not necessary to stop activating the hard disk, deterioration of the hard disk and wait time for activating the hard disk can be reduced.

Moreover, by storing the degenerate program in the semiconductor disk 394, the configuration according to the fourth exemplary embodiment can be commonly utilized with the configuration for realizing the degenerate mode when there is a failure in the hard disk.

The above-described exemplary embodiments described the image forming apparatus. However, the present invention can be applied to apparatuses other than the image forming apparatus. For example, the present invention can be applied to any apparatus which includes a controller unit and a unit controlled by the controller unit, and in which it is necessary to cause the unit to perform a specific operation at specific timing even in the power saving mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   an image forming unit configured to form an image on a sheet;
   a first control unit configured to control the image forming apparatus;
   a second control unit configured to control the image forming unit based on control of the first control unit; and
   a signal output unit configured to output a control signal to the image forming unit in a state that power supply to the first control unit is stopped,
   wherein when power supply to the image forming unit is started, (a) in a case where the control signal is output from the signal output unit to the image forming unit, the image forming unit operates in a first mode in a state that power in not supplied to the first control unit, and (b) in a case where the control signal is not output from the signal output unit to the image forming unit, the image forming unit operates in a second mode.

2. The image forming apparatus according to claim 1, wherein the first mode is a mode in which the image forming unit performs a specific operation and does not form an image on a sheet, and wherein the second mode is a mode in which the image forming unit forms an image on a sheet.

3. The image forming apparatus according to claim 2, wherein the image forming unit includes a photosensitive drum, and wherein the image forming unit rotates the photosensitive drum at a predetermined time interval, as the specific operation.

4. The image forming apparatus according to claim 1, wherein the signal output unit is a CPLD (Complex Programmable Logic Device).

5. The image forming apparatus according to claim 1, wherein the signal output unit outputs the control signal to the image forming unit according to a set timer value.

6. The image forming apparatus according to claim 5, wherein the first control unit sets the timer value.

7. The image forming apparatus according to claim 5, wherein the signal output unit outputs the control signal to the image forming unit according to the set timer value, and outputs a first electronic power control signal for supplying power to the image forming.

8. The image forming apparatus according to claim 1, wherein the signal output unit outputs a first electronic power control signal for supplying power to the image forming unit, and a second electronic power control signal for supplying power to the first control unit.

9. The image forming apparatus according to claim 8, further comprising a switch which is provided between the image forming unit and a power supply unit which is for supplying power to the image forming unit,
wherein the switch is turned on or off by the first electronic power control signal output from the signal output unit.

10. The image forming apparatus according to claim 8, further comprising a switch which is provided between the first control unit and a power supply unit which is for supplying power to the first control unit,
wherein the switch is turned on or off by the second electronic power control signal output from the signal output unit.

11. The image forming apparatus according to claim 8, further comprising:
a first switch which is provided between the image forming unit and a power supply unit which is for supplying power; and
a second switch which is provided between the first control unit and the power supply unit,
wherein the first switch is turned on or off by the first electronic power control signal output from the signal output unit, and the second switch is turned on or off by the second electronic power control signal output from the signal output unit.

12. The image forming apparatus according to claim 1, wherein the control signal output from the signal output unit is input to the image forming unit without going through the first control unit.

13. The image forming apparatus according to claim 1, further comprising a hard disk unit configured to store image data,
wherein the signal output unit outputs the control signal to the second control unit in a state that power supply to the hard disk unit is stopped.

14. The image forming apparatus according to claim 1, wherein the first control unit outputs image data to the second control unit.

15. The image forming apparatus according to claim 1, further comprising a reading unit configured to read an image of a document,
wherein the first control unit receives image data of the image read by the reading unit.

16. The image forming apparatus according to claim 1, wherein when power supply to the image forming unit is started, (a) in a case where the control signal is output from the signal output unit to the image forming unit, the image forming unit operates in the first mode without activating the first control unit.

17. The image forming apparatus according to claim 1, wherein when power supply to the image forming unit is started, (b) in a case where the control signal is not output from the signal output unit to the image forming unit, the image forming unit operates in the second mode in a state that power is supplied to the first control unit.

18. The image forming apparatus according to claim 1, wherein the second control unit outputs a signal for notifying a state of the image forming unit to the signal output unit.

19. The image forming apparatus according to claim 18, wherein the signal output from the second control unit is input to the signal output unit without going through the first control unit.

20. A method for controlling an image forming apparatus which includes an image forming unit configured to form an image on a sheet, a first control unit configured to control the image forming apparatus, a second control unit configured to control the image forming unit based on control of the first control unit, and a signal output unit configured to output a control signal to the image forming unit, the method comprising;
outputting, by the signal output unit, the control signal to the image forming unit in a state that power supply to the first control unit is stopped;
supplying power to the image forming unit which,
wherein when the power is supplied to the image forming unit, (a) in a case where the control signal is output to the image forming unit, the image forming unit operates in a first mode in a state that power supply to the first control unit is stopped, and (b) in a case where the control signal is not output to the image forming unit, the image forming unit operates in a second mode.

21. The method according to claim 20, wherein the first mode is a mode in which the image forming unit performs a specific operation and does not form an image on a sheet, and wherein the second mode is a mode in which the image forming unit forms an image on a sheet.

22. The method according to claim 21, wherein the image forming unit includes a photosensitive drum, and wherein the image forming unit rotates the photosensitive drum at a predetermined time interval, as the specific operation.

23. The method according to claim 21, wherein when the power is supplied to the image forming unit, (b) in a case where the control signal is not output from the signal output unit to the image forming unit, the image forming unit operates in the second mode in a state that power is supplied to the first control unit.

* * * * *